United States Patent
Hisano et al.

(10) Patent No.: US 8,593,093 B2
(45) Date of Patent: Nov. 26, 2013

(54) ELECTRIC MOTOR CONTROL APPARATUS

(75) Inventors: Yuya Hisano, Chiyoda-ku (JP); Ryo Nakamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 158 days.

(21) Appl. No.: 13/251,843

(22) Filed: Oct. 3, 2011

(65) Prior Publication Data

US 2012/0235610 A1  Sep. 20, 2012

(30) Foreign Application Priority Data

Mar. 17, 2011 (JP) ................................. 2011-059118

(51) Int. Cl.
*H02H 7/08* (2006.01)

(52) U.S. Cl.
USPC ............ 318/400.21; 318/400.01; 318/400.26; 318/432

(58) Field of Classification Search
USPC .......... 318/700, 400.01, 400.21, 400.26, 432, 318/434
See application file for complete search history.

(56) References Cited

U.S. PATENT DOCUMENTS

| | | | | |
|---|---|---|---|---|
| 6,593,714 | B2 * | 7/2003 | Nagayama | 318/400.07 |
| 6,913,109 | B2 * | 7/2005 | Kodama et al. | 180/446 |
| 7,091,684 | B2 * | 8/2006 | Kobayashi et al. | 318/432 |
| 7,450,355 | B2 * | 11/2008 | Ochiai | 361/31 |
| 8,232,756 | B2 * | 7/2012 | Yoshihara et al. | 318/434 |

FOREIGN PATENT DOCUMENTS

| | | |
|---|---|---|
| DE | 102005012779 A1 | 10/2005 |
| JP | 2000-184774 A | 6/2000 |
| JP | 2003-143891 A | 5/2003 |
| JP | 2004-155233 A | 6/2004 |
| JP | 2005-130673 A | 5/2005 |
| JP | 2007-209105 A | 8/2007 |
| JP | 2010-22196 A | 1/2010 |

OTHER PUBLICATIONS

German Office Action, dated Aug. 1, 2012, issued in corresponding German Application No. 10 2011 085 896.2.
Japanese Office Action, dated Feb. 26, 2013, issued in corresponding Japanese Application No. 2011-059118.

* cited by examiner

*Primary Examiner* — Bentsu Ro
*Assistant Examiner* — Thai Dinh
(74) *Attorney, Agent, or Firm* — Sughrue Mion, PLLC

(57) ABSTRACT

An electric motor control apparatus capable of controlling a motor normally regardless of failures is obtained without increased cost. The apparatus includes a position sensor failure determination unit which outputs a failure determination signal, and generates a first phase; a motor rotation speed calculator which operates based on the failure determination signal and position sensor signals; a phase command generator producing a phase command based on the first phase, the failure determination signal and rotation speed; an amplitude command generator that generates an amplitude command indicating magnitude of a driving signal for the motor, and an electrical energization unit that applies the driving signal to the motor based on the phase command and the amplitude command. Upon failure of a position sensor, the phase command generator generates the phase command using the first phase, and a second phase obtained based on the first phase and the rotation speed.

11 Claims, 3 Drawing Sheets

ELECTRIC MOTOR CONTROL APPARATUS

BACKGROUND OF THE INVENTION

1. Technical Field

The present invention relates to an electric motor control apparatus which detects magnetic pole positions of a rotor by means of a plurality of position sensors, and controls an electric motor based on a plurality of position sensor signals (detected magnetic pole positions).

2. Description of the Related Art

In general, in an electric motor control apparatus which detects a magnetic pole position of a rotor by the use of a position sensor thereby to control an electric motor, in cases where the position sensor fails, there will be a problem that it becomes impossible to control the electric motor in a normal or ordinary manner.

Accordingly, there has been proposed a technique in which a magnetic pole position estimation means for estimating a magnetic pole position of a rotor is separately provided other than a position sensor, and a determination as to the presence or absence of failure of the position sensor is performed by making a comparison between a signal output from the position sensor (a detected value of the magnetic pole position) and an estimated value of the magnetic pole position (for example, see a first patent document).

In the first patent document, a means for detecting the phase of an induction voltage generated in a stator (armature) during the rotation of an electric motor is used as the magnetic pole position estimation means.

PRIOR ART REFERENCES

Patent Documents

[First Patent Document] Japanese Patent Application Laid-Open No. 2007-209105

SUMMARY OF THE INVENTION

The conventional electric motor control apparatus has a problem that, in order to determine the presence or absence of failure of the position sensor, it is necessary to provide the special magnetic pole position estimation means, as described in the first patent document, so failure determination calculation processing becomes complicated, thus causing an increase in cost, and in addition, performance in controlling the electric motor can not be satisfied to a sufficient extent.

The present invention has been made in order to solve the above-mentioned problem, and has for its object to obtain an electric motor control apparatus which can always control an electric motor in a normal manner by determining the presence or absence of failure of a position sensor, without the addition of a special magnetic pole position estimation means.

In view of the above-mentioned object, an electric motor control apparatus according to this invention is provided with: a plurality of position sensors that detect magnetic pole positions of an electric motor; a position sensor failure determination unit that determines, based on each of position sensor signals from the plurality of position sensors, the failure of at least one of the plurality of position sensors thereby to generate a failure determination signal, and at the same time, generates a first phase based on each of the position sensor signals; a rotation speed calculation unit that calculates a rotation speed of the electric motor based on the failure determination signal and each of the position sensor signals; a phase command generation unit that generates a phase command based on the first phase, the failure determination signal and the rotation speed; an amplitude command generation unit that generates an amplitude command indicating a magnitude of a driving signal for the electric motor; and an electrical energization unit that generates the driving signal based on the phase command and the amplitude command, and applies it to the electric motor; wherein in cases where the failure determination signal indicates the failure of a part of the plurality of position sensors, the phase command generation unit calculates a second phase by the use of the first phase and the rotation speed, and generates the phase command by the use of the first phase and the second phase.

According to the present invention, the presence or absence of failure of a position sensor can be determined without adding any special magnetic pole position estimation means, and besides, even if a part of the position sensors fails, the control of the electric motor can be continued by the use of a position sensor signal(s) detected by the other healthy or normal position sensor(s).

In addition, in cases where all the position sensors fail, it is possible to continue or stop the control of the electric motor in accordance with a control state of the electric motor control apparatus.

The above and other objects, features and advantages of the present invention will become more readily apparent to those skilled in the art from the following detailed description of a preferred embodiment of the present invention when taken in conjunction with the accompanying drawings.

BEST MODE FOR CARRYING OUT THE INVENTION

First Embodiment

Hereinafter, a first embodiment of the present invention will be explained in detail while referring to the accompanying drawings.

Figure 1:
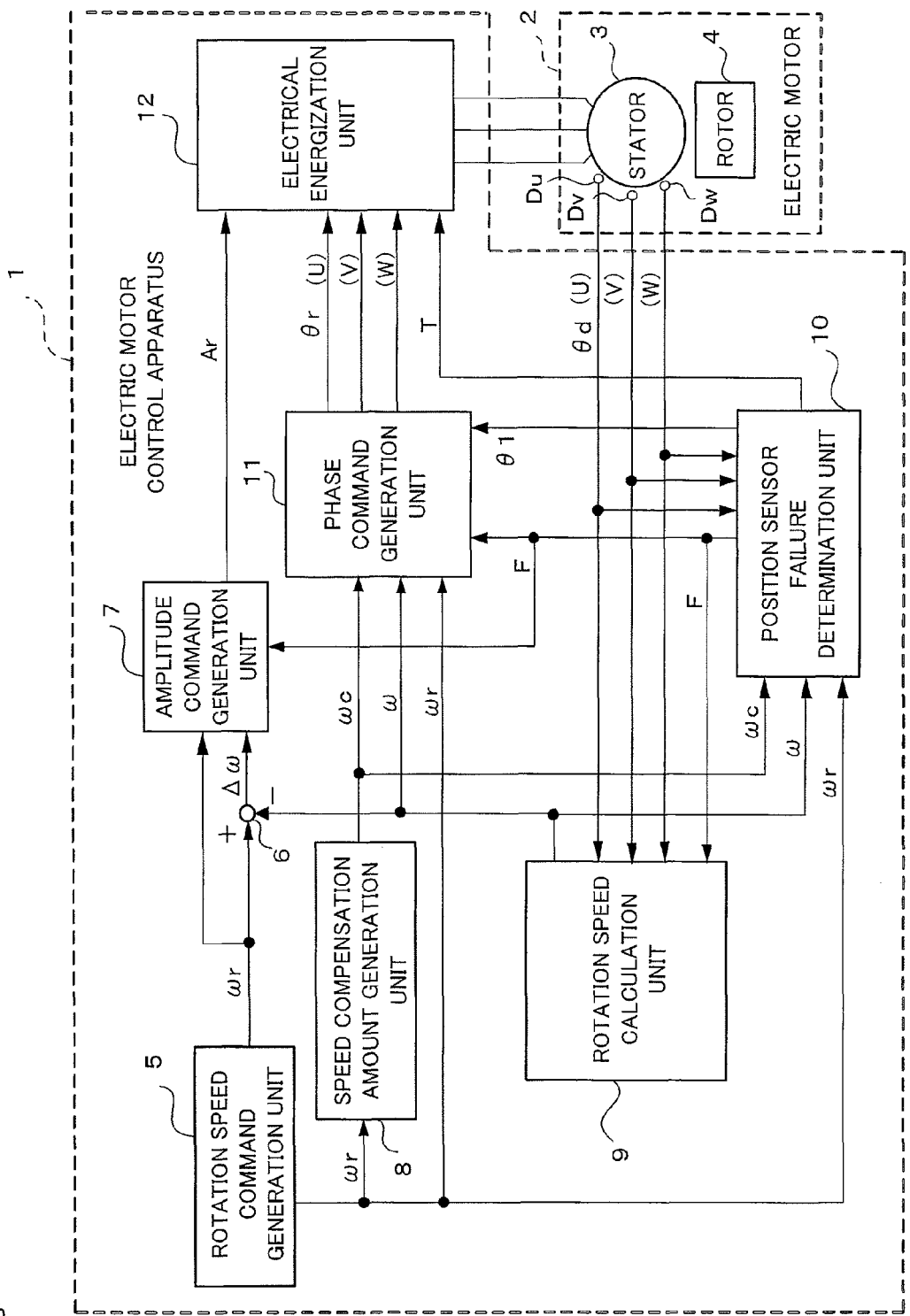
FIG. 1 is a block diagram showing the overall construction of an electric motor control apparatus according to a first embodiment of the present invention.

FIG. 1 is a block diagram showing the overall construction of an electric motor control apparatus, together with an electric motor, according to the first embodiment of the present invention.

In FIG. 1, the electric motor 2 (e.g., synchronous motor), which is controlled by the electric motor control apparatus 1, is provided with a stator 3 that has a plurality of poles around each of which a winding is wound, and a rotor 4 that has poles of a permanent magnet arranged in opposition to the stator 3.

A driving signal of three phases (U, V, W) from the electric motor control apparatus 1 is applied to the windings of the stator 3, respectively.

Although not specifically shown in FIG. 1, in order to detect the magnetic pole positions of three phases (U, V, W) of the rotor 4, three position sensors Du, Dv, Dw (e.g., Hall devices) are mounted on the stator 3 of the electric motor 2.

The three position sensors Du, Dv, Dw are included in a function of the electric motor control apparatus 1, and generate position sensor signals θd of three phases (U, V, W) as detection signals.

The electric motor control apparatus 1 is provided with a rotation speed command generation unit 5 that generates a rotation speed command ωr for controlling the electric motor 2, a subtractor 6 that calculates a rotation speed deviation Δω (rotation speed command ωr−rotation speed ω), an amplitude command generation unit 7 that generates an amplitude command Ar, a speed compensation amount generation unit 8 that generates an amount of speed compensation ωc (hereinafter also referred to as a speed compensation amount), a rotation speed calculation unit 9 that calculates a rotation speed ω of the electric motor 2, a position sensor failure determination unit 10 that determines the presence or absence of failure of the position sensors Du, Dv, Dw, a phase command generation unit 11 that generates a phase command θr of three phases (U, V, W), and an electrical energization unit 12 that applies the driving signal of three phases to the windings of the stator 3.

The speed compensation amount generation unit 8 generates the speed compensation amount ωc based on an amount of change of the rotation speed command ωr.

As the speed compensation amount ωc (the amount of change of the rotation speed command ωr), there is used, for example, a subtraction value which is obtained by subtracting the last value ωrb of the rotation speed command ωr from the current value ωra of the rotation speed command ωr, or a value which is obtained by further multiplying this subtraction value by a speed compensation magnification factor.

For example, in cases where it is known in advance that the amount of change of the rotation speed ω of the electric motor 2 is small with respect to the amount of change of the rotation speed command ωr, the speed compensation amount generation unit 8 generates, as the speed compensation amount ωc, a value which is obtained by multiplying the above-mentioned subtraction value by the speed compensation magnification factor of less than 1.

As a result of this, accuracy in the calculation of each of a determination phase θj, which is calculated in the position sensor failure determination unit 10, and a second phase θ2 and a phase command θr (to be described later), which are calculated in the phase command generation unit 11, can be enhanced.

The rotation speed calculation unit 9 calculates the rotation speed ω of the electric motor 2 by the use of a healthy or normal position sensor signal selected from among the position sensor signals θd for three phases.

For example, the rotation speed calculation unit 9 temporally measures the pulse interval of a position sensor signal for a certain one phase and calculates the rotation speed ω therefrom, but a position sensor signal, which is determined to be in failure based on a failure determination signal F from the position sensor failure determination unit 10, should not be used for the calculation of the rotation speed ω.

For example, the rotation speed calculation unit 9 calculates the rotation speed ω by the use of each of the position sensor signals θd for three phases, and selects and generates, as a rotation speed ω to be actually outputted, the rotation speed ω which has been calculated based on the healthy or normal position sensor signal. Here, note that the healthy or normal position sensor signal can be specified by means of the failure determination signal F.

The amplitude command generation unit 7 recognizes the state of presence or absence of the failure of the position sensors Du, Dv, Dw based on the failure determination signal F, and in cases where all the position sensors Du, Dv, Dw are in failure, the amplitude command generation unit 7 generates the amplitude command Ar based on the rotation speed command ωr, whereas in cases where a part of the position sensors Du, Dv, Dw are in failure, or in cases where all the position sensors Du, Dv, Dw are normal (not in failure), the amplitude command generation unit 7 generates the amplitude command Ar based on the rotation speed deviation Δω.

In the amplitude command generation unit 7, as a specific calculation method at the time of generating the amplitude command Ar based on the rotation speed deviation Δω, it is mentioned that the amplitude command Ar proportional to the rotation speed deviation Δω is generated by performing proportional (P) control, or the sum of a term proportional to the rotation speed deviation Δω and a term proportional to an integrated value of the rotation speed deviation Δω is made as the amplitude command Ar by performing proportional and integral (PI) control.

Here, note that in cases where the control of the electric motor 2 can become unstable when a large difference occurs between the amplitude command Ar based on the rotation speed deviation Δω and the amplitude command Ar based on the rotation speed command ωr, and when these amplitude commands Ar are switched over from one to the other, for example, in the amplitude command generation unit 7, processing may be added in which a low pass filter is applied to the amplitude commands Ar to provide a final amplitude command Ar.

When the position sensor failure determination unit 10 calculates a first phase θ1 based on each of position sensor signals θd for three phases, and at the same time generates a failure determination signal F if there is a difference between the first phase θ1 and the determination phase θj, which is equal to or larger than a predetermined value. The failure determination signal F has its value set in such a manner that the presence or absence of failure of each of the position sensors for three phases can be found.

For example, the position sensor failure determination unit 10 sets the failure determination signal F to be three bits, and assigns the individual bits to the individual phases, respectively, and when a position sensor is healthy or normal, is set to "0" (normal value), whereas when a position sensor is in failure, it is set to "1" (abnormal value).

In addition, the position sensor failure determination unit 10 inputs the first phase θ1 to the phase command generation unit 11. The detailed function of the position sensor failure determination unit 10 will be described later.

The phase command generation unit 11 generates the phase command θr based on the failure determination signal F, the first phase θ1, the speed compensation amount ωc, and the rotation speed ω. The detailed function of the phase command generation unit 11 will be described later.

The electrical energization unit 12 generates an alternating current driving signal based on the amplitude command Ar and the phase command θr.

Specifically, as the electrical energization unit 12, there is mentioned a PWM (Pulse Width Modulation) inverter, a PAM (Pulse Amplitude Modulation) inverter, or the like. In addition, as a rough classification of inverters, there exist two kinds, a voltage type inverter and a current type inverter, but here, it is assumed that a voltage type PWM inverter is used.

In the following, the detailed function of the position sensor failure determination unit 10 will be described, first for the first phase θ1.

Figure 2:
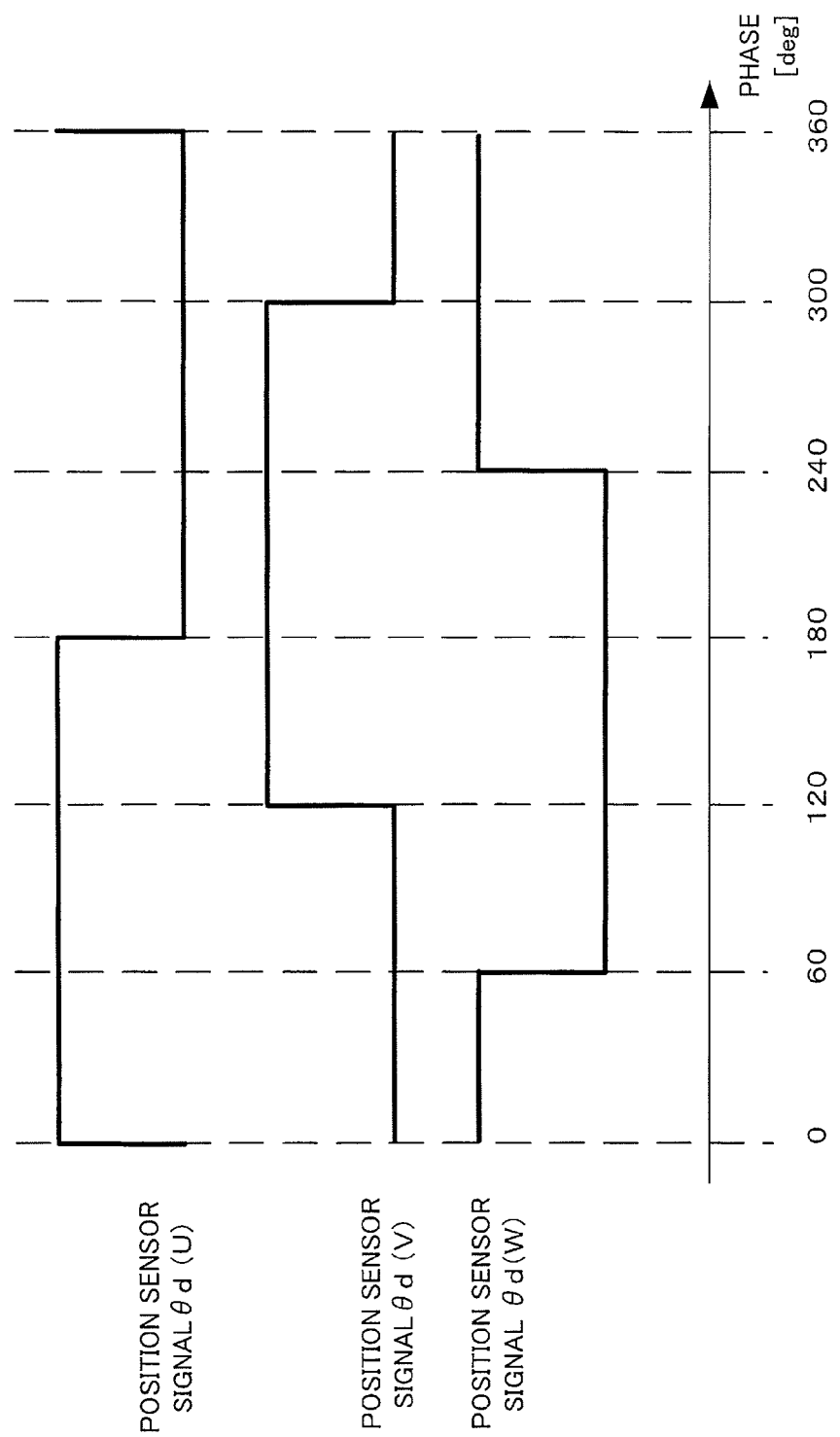
FIG. 2 is a timing chart showing the patterns of position sensor signals according to the first embodiment of the present invention.

FIG. 2 is a timing chart which schematically shows the position sensor signals θd for three phases and the values [deg] of the phases θ therefor when the electric motor 2 makes one revolution.

The value of each phase θ is obtained by detecting a rise or a fall of a corresponding position sensor signal θd.

In other words, it is obtained such that in a position sensor signal θd of the U phase, a rise is 0 degrees and a fall is 180 degrees, and in a position sensor signal θd of the V phase, a rise is 120 degrees and a fall is 300 degrees, and in a position sensor signal θd of the W phase, a rise is 240 degrees and a fall is 60 degrees.

In this manner, the values of the phases θ at every 60 degrees can be obtained from the position sensor signals θd. The phase obtained from each of the position sensor signals θd is generated and outputted as the first phase θ1.

Here, note that after the first phase θ1 has been obtained, the determination phase θj, which becomes a failure determination reference for the position sensors Du, Dv, Dw, is calculated as shown in the following equation (1) in the position sensor failure determination unit 10.

$$\theta j = \theta 1 + (\omega + \omega c) \times t1 \quad (1)$$

Here, in equation (1) above, a time t1 is set to "0", at the time when the first phase θ1 has been obtained.

Next, reference will be made to an operation to generate the failure determination signal F according to the first embodiment of the present invention, as shown in FIG. 1, while referring to FIG. 2 and FIG. 3.

Figure 3:
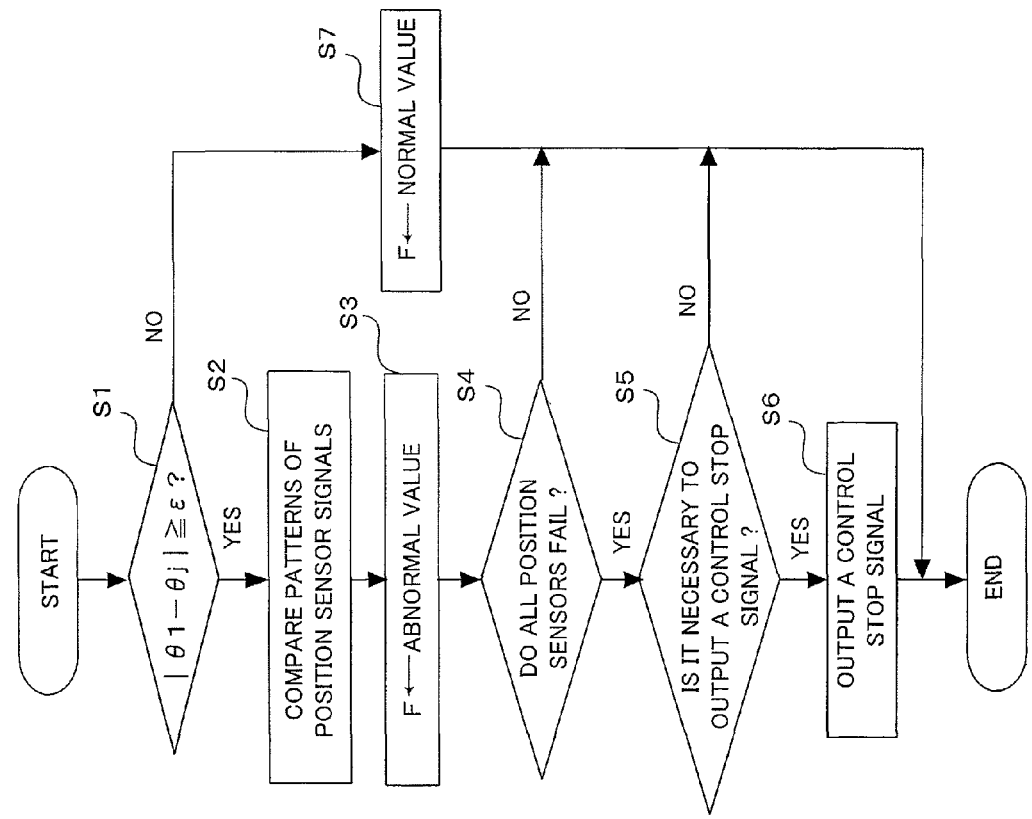
FIG. 3 is a flow chart showing the operation of a position sensor failure determination unit in FIG. 1.

FIG. 3 is a flow chart which shows the operation of the position sensor failure determination unit 10, wherein generation processing (steps S1 through S8) of the failure determination signal F based on a comparison between the first phase θ1 and the determination phase θj is illustrated.

In FIG. 3, first, when a change occurs in the position sensor signals θd and the value of the first phase θ1 is updated, the position sensor failure determination unit 10 makes a comparison between a deviation |θ1−θj| of the updated value of the first phase θ1 from the value of the determination phase θj and a predetermined value ε, and determines whether the relation of |θ1−θj|≥ε is satisfied (step S1).

Here, note that the predetermined value ε is a value which is set by taking into consideration the deviation of the first phase θ1 from the determination phase θj in the case where the control of the electric motor 2 is carried out in a normal manner with all the position sensors Du, Dv, Dw being healthy or normal, the required accuracy in position sensor failure detection, and so on. It is assumed that the predetermined value ε is set to "10 degrees", for example.

In addition, the predetermined value ε does not need to be a fixed value, but can be set to be variable. For example, in cases where the deviation of the first phase θ1 from the determination phase θj in the case where the control of the electric motor 2 is carried out normally varies according to the rotation speed ωs of the electric motor 2, or in cases where the required accuracy in position sensor failure detection varies according to the rotation speed ωs of the electric motor 2, the predetermined value ε may be set to different values according to the rotation speed ω of the electric motor 2.

In step S1, when it is determined that |θ1−θj|<ε (that is, NO), it is assumed that the position sensor signals θd (the position sensors Du, Dv, Dw) are normal, and the failure determination signal F is set to a normal value (e.g., "0"), and the processing routine of FIG. 3 is ended.

On the other hand, in step S1, when it is determined that |θ1−θj|≥ε (that is, YES), an abnormality has occurred in either of the position sensor signals θd (the position sensors Du, Dv, Dw), so it is assumed that at least one position sensor is in failure, and a comparison is made between a detected pattern of each of the position sensor signals θd and a reference pattern at the time of the normal state thereof (step S2).

Specifically, the relation between combinations of the values of normal position sensor signals θd and their phases θ is known in advance, so a position sensor with a difference in phase having actually been generated is specified by making a comparison between a combination of the values of the position sensor signals θd actually obtained and a combination of the values of the position sensor signals (e.g., normal patterns as shown in FIG. 2) which should be originally obtained based on the determination phase θj calculated by the equation (1).

Then, it is assumed that the position sensor with a difference in phase having been generated, which has been found in step S2 (the pattern comparison of the position sensor signals θd), is in failure, and the failure determination signal F is set to an abnormal value (e.g., the bit corresponding to the failed position sensor is set to "1") (step S3).

Subsequently, based on the value of the failure determination signal F set in step S3, it is determined whether all the position sensors Du, Dv, Dw are in failure (step S4), and when it is determined that at least one position sensor is normal (that is, NO), the processing routine of FIG. 3 is ended.

On the other hand, when the value of the failure determination signal F is "111", and a determination is made in step S4 that all the position sensors Du, Dv, Dw are in failure (that is, YES), subsequently, it is determined whether it is necessary to output a control stop signal T (step S5).

In cases where a determination is made that all the position sensors Du, Dv, Dw are in failure, the phase command θr is generated based on the rotation speed command ωr in the phase command generation unit 11, as will be described later, so it is possible to continue the control of the electric motor 2, but it may not be desirable to continue the control of the electric motor 2, depending on the control state of the electric motor control apparatus 1 (to be described later).

Even in cases where all the position sensors Du, Dv, Dw are in failure, when it is possible to continue the control of the electric motor 2 and hence a determination is made in step S5 that it is not necessary to output a control stop signal T (that is, NO), the processing routine of FIG. 3 is ended.

On the other hand, in cases where all the position sensors Du, Dv, Dw are in failure, when a determination is made that it is undesirable to continue the control of the electric motor 2 and it is necessary to output a control stop signal T (that is, YES), a control stop signal T is outputted to the electrical energization unit 12, whereby the driving of the electric motor 2 is stopped (step S6), and the processing routine of FIG. 3 is ended.

Here, reference will be made to a case in which the continuation of the control of the electric motor 2 at the time of failure of all the position sensors Du, Dv, Dw is not desirable, depending on the control state of the electric motor 2, by taking a specific example.

At the time of continuing the control of the electric motor 2 by generating the phase command θr based on the rotation speed command w r in the phase command generation unit 11, in cases where the phase command θr generated based on the rotation speed command ωr shifts greatly with respect to a phase command which should be originally outputted, there will be a possibility that the electric motor 2 may step out, and an excess current may continue to flow into the electric motor 2 from the electrical energization unit 12, thereby destroying the electrical energization unit 12 (PWM inverter).

In order to prevent such damage to the electrical energization unit 12, it is desirable, for example, to add an overcurrent detection unit for detecting an excess current flowing into the electric motor 2 or the electrical energization unit 12 (PWM inverter), and to output a control stop signal T at the time of detecting the excess current.

As a detection unit for an excess current, there can be applied a simple current detection unit which uses a shunt resistance and a shunt IC, for example.

Here, note that the current detection unit as mentioned above should just have accuracy and a detection speed to such an extent as capable of detecting an excess current flowing through the electric motor 2 or the electrical energization unit 12 (PWM inverter), and hence it is not necessary to use a highly accurate and high-speed current detection unit for current phase detection of the electric motor 2, as a result of which an exceptional increase in cost is not caused.

In the following, reference will be made to the detailed function of the phase command generation unit 11 according to the first embodiment of the present invention.

According to the processing of FIG. 3, which position sensor is in failure is found based on the failure determination signal F. Here, note that if it is determined that all the position sensors Du, Dv, Dw are normal, the phase command θr can be generated by the use of only the first phase θ1 based on the healthy or normal position sensor signals, but in cases where at least one position sensor is in failure, the phase command θr can not be generated by the use of only the first phase θ1.

For example, in cases where the position sensor Du of the U phase is in failure, the phase command θr corresponding to 0 degrees and 180 degrees which correspond to a rise and a fall, respectively, of a position sensor signal θd(U), can not be generated by the use of the first phase θ1.

Accordingly, the phase command generation unit 11 generates the phase command θr corresponding to 0 degrees and 180 degrees by the use of the second phase θ2.

Here, note that the second phase θ2 is equal to the right hand side of the equation (1) by which the determination phase θj is obtained, and it is substantially equal to the determination phase θj.

Thus, in cases where the phase command θr is generated based on the second phase θ2, without using the first phase θ1, the value of the current second phase θ2 is used as the first phase θ1 which is used at the time of generating the second phase θ2 at the next time.

However, in cases where a determination is made in step S4 from the failure determination signal F "111" that all of the position sensor signals θd are abnormal, the rotation speed ωcan not be calculated, so the second phase θ2 can not be obtained in the form of the right hand side of the equation (1).

Accordingly, in cases where a determination is made that all the position sensor signals θd are abnormal, the phase command generation unit 11 calculates the second phase θ2 by the use of the rotation speed command ωr, as shown in the following equation (2).

$$θ2=θb+ωr×to \quad (2)$$

Here, in equation (2) above, θb is the phase command (calculated value) at the last time, and to is a period or interval of calculation.

In this manner, the phase command generation unit 11 generates the phase command θr based on the first phase θ1 or the second phase θ2, but may also generate, as the phase command θr, a phase which is compensated for by a predetermined value with respect to the first phase θ1 or the second phase θ2.

For example, the electrical energization unit 12 is composed of a voltage type PWM inverter, and serves to supply a voltage signal to the electric motor 2, but in cases where the electric motor 2 is driven to rotate at high speed, the influence of an inductance component of the stator 3 becomes large, so that a current phase is greatly retarded with respect to a voltage phase.

At this time, if the voltage phase is not advanced with respect to a magnetic pole phase, a desired motor efficiency may not be obtained, and in order to obtain a desired rotation speed, it may be necessary to carry out weak magnetic flux control.

In such a case, in order to advance the phase command θr with respect to the magnetic pole phase by a predetermined value, the phase command generation unit 11 outputs, as the phase command θr, a value which is obtained by adding a phase of the predetermined value to the first phase θ1 or the second phase θ2.

Here, note that the weak magnetic flux control means control in which the field magnetic flux generated by the rotor 4 is weakened by the magnetic flux generated by the current of the stator 3 (armature). In order to carry out the weak magnetic flux control, it is necessary to advance the current phase with respect to the magnetic pole phase, in connection with which it is also necessary to advance the voltage phase.

When the electrical energization unit 12 (PWM inverter) is of a rectangular wave drive type in which electrical energization is carried out at a phase angle of 180 degrees and at a phase angle of 120 degrees, the driving signal can be generated by means of the phase command θr at angles of every 60 degrees.

However, in cases where it is necessary for the electrical energization unit 12 to output the phase command θr at angles finer or smaller than 60 degrees, such as when the electrical energization unit 12 (PWM inverter) uses a sinusoidal wave driving type, the phase command generation unit 11 calculates a current phase command θa by the use of the last value θb as the phase command θr, as shown in the following equation (3).

$$θa=θb+(ω+ωc)×to \quad (3)$$

Because the phase command θa (current calculated value), which is obtained from equation (3) above, becomes substantially equal to the second phase θ2, in actuality, the phase command generation unit 11 outputs the second phase θ2 without regard to the failure determination signal F.

In order to separate the case where either the first phase θ1 or the second phase θ2 is selected and outputted based on the failure determination signal F, and the case where the second phase θ2 is outputted without regard to the failure determination signal F, from each other, the phase command generation unit 11 focuses attention on the value change of the first phase θ1.

That is, the phase command generation unit 11 carries out the former of the above-mentioned cases (i.e., selects the first phase θ1 or the second phase θ2) when the value of the first phase θ1 has changed, and carries out the latter case (i.e., outputs the second phase θ2) when the value of the first phase θ1 has not changed.

In addition, in cases where all the position sensors Du, Dv, Dw have failed, the second phase θ2 calculated as shown in the above-mentioned equation (2) is generated.

As described above, the electric motor control apparatus 1 according to the first embodiment (FIG. 1 through FIG. 3) of the present invention is provided with: the plurality of position sensors Du, Dv, Dw that detect magnetic pole positions of the electric motor 2; the position sensor failure determination unit 10 that determines, based on each of position sensor signals θd from the plurality of position sensors Du, Dv, Dw, the failure of at least one of the plurality of position sensors Du, Dv, Dw thereby to generate a failure determination signal F, and at the same time, generates a first phase θ1 based on each of the position sensor signals θd; the rotation speed calculation unit 9 that calculates the rotation speed ω of the electric motor 2 based on the failure determination signal F and each of the position sensor signals θd; the phase command generation unit 11 that generates a phase command θr based on the first phase θ1, the failure determination signal F and the rotation speed ω; the amplitude command generation unit 7 that generates an amplitude command Ar indicating a magnitude of a driving signal for the electric motor 2; and the electrical energization unit 12 that generates the driving signal based on the phase command θr and the amplitude command Ar, and applies it to the electric motor 2.

In cases where the failure determination signal F indicates the failure of a part of the plurality of position sensors Du, Dv, Dw, the phase command generation unit 11 calculates a second phase θ2 by the use of the first phase θ1 and the rotation speed ω, and generates the phase command θr by the use of the first phase θ1 and the second phase θ2.

In addition, in cases where the failure determination signal F indicates the failure of all the plurality of position sensors Du, Dv, Dw, the phase command generation unit 11 generates the phase command θr in accordance with the control state of the electric motor 2.

The failure determination signal F has a plurality of bits corresponding to the individual position sensor signals θd, respectively.

The position sensor failure determination unit 10 has stored in advance at least a part of a normal change pattern of each of the position sensor signals θd, makes a comparison between the normal change pattern and a change pattern of each of the position sensor signals θd, and, in cases where there has occurred a difference therebetween, sets an abnormal value of "1" into a bit corresponding to a position sensor signal in which the difference has occurred, among the plurality of bits of the failure determination signal F.

The position sensor failure determination unit 10 calculates the determination phase θj by the use of each of the position sensor signals θd and the rotation speed ω (equation (1)), and sets the abnormal value of "1" into the failure determination signal F in cases where there has occurred a difference, which is equal to or larger than the predetermined value ε, between the first phase θ1 and the determination phase θj.

In addition, the electric motor control apparatus 1 is provided with the rotation speed command generation unit 5 that generates a rotation speed command ωr for the electric motor 2, and in cases where the failure determination signal F indicates the failure of a part of the plurality of position sensors Du, Dv, Dw, the phase command generation unit 11 calculates a second phase θ2 by the use of the rotation speed command ωr in place of the rotation speed ω.

In this case, the position sensor failure determination unit 10 calculates the determination phase θj by the use of each of the position sensor signals θd and the rotation speed command ωr, and sets the abnormal value of "1" into the failure determination signal F in cases where there has occurred a difference, which is equal to or larger than the predetermined value ε, between the first phase θ1 and the determination phase θj.

Moreover, the electric motor control apparatus 1 is provided with the rotation speed command generation unit 5 that generates a rotation speed command ωr for the electric motor 2, and the speed compensation amount generation unit 8 that generates a speed compensation amount ωc based on the rotation speed command ωr, wherein in cases where the failure determination signal F indicates the failure of a part of the plurality of position sensors Du, Dv, Dw, the phase command generation unit 11 calculates a second phase θ2 by the use of the speed compensation amount ωc in addition to the first phase θ1 and the rotation speed ω.

The speed compensation amount generation unit 8 generates the speed compensation amount ωc based on an amount of change of the value of the rotation speed command ωr.

In this case, the position sensor failure determination unit 10 calculates the determination phase θj by the use of each of the position sensor signals θd, the rotation speed ω and the speed compensation amount ωc, and sets the abnormal value of "1" into the failure determination signal F and outputs it in cases where there has occurred a difference, which is equal to or larger than the predetermined value ε, between the first phase θ1 and the determination phase θj.

Further, in cases where a determination is made that all the plurality of position sensors Du, Dv, Dw are in failure, the position sensor failure determination unit 10 generates a control stop signal T to the electrical energization unit 12, thereby stopping the driving of the electric motor 2.

In cases where the failure determination signal F indicates the failure of a part of the plurality of position sensors Du, Dv, Dw, the rotation speed calculation unit 9 calculates the rotation speed ω by the use of a healthy or normal position sensor signal(s) θd.

As a result of this, even if a part of the plurality of position sensors Du, Dv, Dw fails, it becomes possible to continue the control of the electric motor 2 based on the healthy position sensor signal(s) θd.

In addition, in cases where all the position sensors Du, Dv, Dw fail, it becomes possible to continue or stop the control of the electric motor 2 in accordance with the control state of the electric motor 2 by means of the electric motor control apparatus 1.

Accordingly, it becomes possible to determine the presence or absence of failure of the position sensors Du, Dv, Dw without adding a special magnetic pole position estimation unit, and the electric motor 2 can always be controlled in a normal manner, without causing an increase in cost.

Here, note that in the above-mentioned first embodiment (FIG. 1), the amplitude command Ar is generated based on the rotation speed deviation Δω, but the generation method of the amplitude command Ar is not limited to this. For example, the amplitude command Ar may be generated based on the rotation speed command ω r without regard to the presence or absence of failure of the position sensors Du, Dv, Dw, or the amplitude command Ar may be generated by means of vector control using a dq coordinate system.

In addition, although the electric motor control apparatus 1 is shown which controls the electric motor 2 (e.g., synchronous motor) by a three-phase alternating current, the number of phases of the alternating current and the number of position sensors are not limited to those described and shown herein.

Further, although the explanation has been made by taking, as an example, the case where the electric motor 2 to be controlled is a synchronous motor, the kind of the electric motor 2 is not limited to the synchronous motor.

As described above, although a suitable example has been explained as the first embodiment of the present invention, the present invention is not limited only to the above-mentioned first embodiment, but it is apparent to those skilled in the art that various changes and modifications can be made within the technical scope of the present invention.

What is claimed is:

1. An electric motor control apparatus comprising:
a plurality of position sensors that detect magnetic pole positions of an electric motor;
a position sensor failure determination unit that determines, based on each of position sensor signals from said plurality of position sensors, the failure of at least one of said plurality of position sensors thereby to generate a failure determination signal, and at the same time, generates a first phase based on each of said position sensor signals;
a rotation speed calculation unit that calculates a rotation speed of said electric motor based on said failure determination signal and each of said position sensor signals;
a phase command generation unit that generates a phase command based on said first phase, said failure determination signal and said rotation speed;
an amplitude command generation unit that generates an amplitude command indicating a magnitude of a driving signal for said electric motor; and
an electrical energization unit that generates said driving signal based on said phase command and said amplitude command, and applies it to said electric motor;
wherein in cases where said failure determination signal indicates the failure of a part of said plurality of position sensors, said phase command generation unit calculates a second phase by the use of said first phase and said rotation speed, and generates said phase command by the use of said first phase and said second phase.

2. The electric motor control apparatus as set forth in claim 1, wherein
in cases where said failure determination signal indicates the failure of all said plurality of position sensors, said phase command generation unit generates said phase command in accordance with a control state of said electric motor.

3. The electric motor control apparatus as set forth in claim 1, wherein
said failure determination signal has a plurality of bits corresponding to said individual position sensor signals, respectively; and
said position sensor failure determination unit has stored in advance at least a part of a normal change pattern of each of said position sensor signals, makes a comparison between said normal change pattern and a change pattern of each of said position sensor signals, and, in cases where there has occurred a difference therebetween, sets an abnormal value into a bit corresponding to a position sensor signal in which said difference has occurred, among the plurality of bits of said failure determination signal.

4. The electric motor control apparatus as set forth in claim 1, further comprising:
a rotation speed command generation unit that generates a rotation speed command for said electric motor;
wherein in cases where said failure determination signal indicates the failure of a part of said plurality of position sensors, said phase command generation unit calculates said second phase by the use of said rotation speed command in place of said rotation speed.

5. The electric motor control apparatus as set forth in claim 1, further comprising:
a rotation speed command generation unit that generates a rotation speed command for said electric motor; and
a speed compensation amount generation unit that generates a speed compensation amount based on said rotation speed command;
wherein in cases where said failure determination signal indicates the failure of a part of said plurality of position sensors, said phase command generation unit calculates said second phase by the use of said speed compensation amount in addition to said first phase and said rotation speed.

6. The electric motor control apparatus as set forth in claim 5, wherein
said speed compensation amount generation unit generates said speed compensation amount based on an amount of change of the value of said rotation speed command.

7. The electric motor control apparatus as set forth in claim 1, wherein
said position sensor failure determination unit calculates the determination phase by the use of each of said position sensor signals and said rotation speed, and sets an abnormal value into said failure determination signal in cases where there has occurred a difference, which is equal to or larger than a predetermined value, between said first phase and said determination phase.

8. The electric motor control apparatus as set forth in claim 1, further comprising:
a rotation speed command generation unit that generates a rotation speed command for said electric motor;
wherein said position sensor failure determination unit calculates the determination phase by the use of each of said position sensor signals and said rotation speed command, and sets an abnormal value into said failure determination signal in cases where there has occurred a difference, which is equal to or larger than a predetermined value, between said first phase and said determination phase.

9. The electric motor control apparatus as set forth in claim 1, further comprising:
a rotation speed command generation unit that generates a rotation speed command for said electric motor; and
a speed compensation amount generation unit that generates a speed compensation amount based on said rotation speed command;
wherein said position sensor failure determination unit calculates the determination phase by the use of each of said position sensor signals, said rotation speed and said speed compensation amount, and sets an abnormal value into said failure determination signal and outputs it in cases where there has occurred a difference, which is equal to or larger than a predetermined value, between said first phase and said determination phase.

10. The electric motor control apparatus as set forth in claim 1, wherein
in cases where a determination is made that all said plurality of position sensors are in failure, said position sensor failure determination unit generates a control stop signal to said electrical energization unit, thereby stopping the driving of said electric motor.

11. The electric motor control apparatus as set forth in claim 1, wherein
in cases where said failure determination signal indicates the failure of a part of said plurality of position sensors, said rotation speed calculation unit calculates said rotation speed by the use of a normal position sensor signal.

* * * * *